United States Patent
Tanno et al.

(10) Patent No.: US 8,365,782 B2
(45) Date of Patent: Feb. 5, 2013

(54) TIRE NOISE REDUCTION DEVICE AND PNEUMATIC TIRE

(75) Inventors: Atsushi Tanno, Hiratsuka (JP); Masayuki Taketani, Tokyo (JP)

(73) Assignees: The Yokohama Rubber Co., Ltd., Tokyo (JP); Mitsubishi Jidosha Kogyo Kabushiki Kaisha, Tokyo (JP)

(*) Notice: Subject to any disclaimer, the term of this patent is extended or adjusted under 35 U.S.C. 154(b) by 506 days.

(21) Appl. No.: 12/441,702

(22) PCT Filed: Sep. 25, 2007

(86) PCT No.: PCT/JP2007/068552
§ 371 (c)(1), (2), (4) Date: Mar. 17, 2009

(87) PCT Pub. No.: WO2008/038629
PCT Pub. Date: Apr. 3, 2008

(65) Prior Publication Data
US 2010/0012244 A1 Jan. 21, 2010

(30) Foreign Application Priority Data
Sep. 26, 2006 (JP) .................................. 2006-260112

(51) Int. Cl.
*B60C 19/00* (2006.01)
*B60C 5/00* (2006.01)
(52) U.S. Cl. ........................................ 152/157; 181/207
(58) Field of Classification Search .......... 152/155–159, 152/165; *B60C 5/00*
See application file for complete search history.

(56) References Cited

U.S. PATENT DOCUMENTS

| | | | |
|---|---|---|---|
| 7,387,141 B2 | 6/2008 | Tanno et al. | |
| 7,556,075 B2 * | 7/2009 | Tanno | 152/155 |
| 7,735,532 B2 * | 6/2010 | Tanno et al. | 152/157 |
| 7,854,244 B2 | 12/2010 | Tanno | |
| 2003/0020320 A1 | 1/2003 | Yukawa et al. | |
| 2003/0188817 A1 | 10/2003 | Yukawa et al. | |
| 2005/0098251 A1 | 5/2005 | Yukawa | |
| 2006/0157180 A1 | 7/2006 | Tanno et al. | |
| 2006/0185777 A1 | 8/2006 | Tanno | |
| 2007/0074798 A1 | 4/2007 | Tanno et al. | |
| 2007/0119532 A1 | 5/2007 | Tanno et al. | |
| 2007/0175559 A1 | 8/2007 | Tanno et al. | |
| 2007/0199636 A1 * | 8/2007 | Tanno | 152/520 |
| 2010/0012243 A1 | 1/2010 | Tanno et al. | |

FOREIGN PATENT DOCUMENTS

| | | |
|---|---|---|
| JP | A 2003-48407 | 2/2003 |
| JP | A 2003-226104 | 8/2003 |

(Continued)

OTHER PUBLICATIONS

English Machine Translation of JP 2005/075206, Mar. 2005.*

*Primary Examiner* — Justin Fischer
*Assistant Examiner* — Philip N Schwartz
(74) *Attorney, Agent, or Firm* — Greer, Burns & Crain, Ltd.

(57) ABSTRACT

A tire noise reduction device and a pneumatic tire, in which tire vibration can be reduced while durability is maintained and tire noise is reduced. The tire noise reduction device includes two main sound absorbing members for changing the cross-sectional area of a cavity of a tire in the circumferential direction of the tire and two assistant sound absorbing members disposed between the two main sound absorbing members. Each of the sound absorbing members is formed of a porous material. Each main sound absorbing member includes a first sound absorbing part and a second sound absorbing part, where the second sound absorbing part has a density lower than that of the first sound absorbing part. Each assistant sound absorbing member has a density higher than that of the second sound absorbing part and a thickness less than that of the main sound absorbing member.

18 Claims, 4 Drawing Sheets

FOREIGN PATENT DOCUMENTS

| | | |
|---|---|---|
| JP | 2005075206 A * | 3/2005 |
| JP | A 2005-138760 | 6/2005 |
| WO | WO 2005/012005 A1 | 2/2005 |
| WO | WO 2005/012008 A1 | 2/2005 |
| WO | WO 2005012005 A1 * | 2/2005 |
| WO | WO 2005/058616 A1 | 6/2005 |
| WO | WO 2005/072991 A1 | 8/2005 |
| WO | WO 2005/087515 A1 | 9/2005 |
| WO | WO 2005100051 * | 10/2005 |
| WO | WO 2006/088000 A1 | 8/2006 |
| WO | WO2006/088195 | 8/2006 |
| WO | WO 2007/058311 A1 | 5/2007 |

* cited by examiner

TIRE NOISE REDUCTION DEVICE AND PNEUMATIC TIRE

This application is a U.S. National Phase under 35 U.S.C. §371 of International Application No. PCT/JP2007/068552, filed Sep. 25, 2007.

TECHNICAL FIELD

The present invention relates to a tire noise reduction device and a pneumatic tire having the tire noise reduction device, and more particularly to a tire noise reduction device and a pneumatic tire capable of reducing tire vibration.

TECHNICAL BACKGROUND

A cavity resonance phenomenon that occurs in an airtightly sealed tire cavity formed between the rim of a wheel and a pneumatic tire mounted on the rim is a major factor of tire noise. Noise around 250 Hz regularly heard during running or impulsive sounds generated in running over joint lines or the like of a road, for example, is involved with the cavity resonance phenomenon.

As a technique for reducing noise caused by such a cavity resonance phenomenon, there is known, for example, a technique such that sound absorbing members of a porous material such as urethane resin foam are disposed at two opposed locations in the circumferential direction of a tire on the inner surface of the tread portion facing the tire cavity so as to vary the cross-sectional area of the tire cavity in the circumferential direction of the tire (see a patent document 1, for example). Such a variation of the cross-sectional area of the tire cavity in the tire circumferential direction makes resonant frequency varied with rotation of the tire every second, and a sound absorbing effect is obtained by the sound absorbing members, whereby cavity resonance noise is effectively reduced. Further, by increasing the density of the sound absorbing members, the mechanical strength of the sound absorbing members is enhanced, obtaining durability.

However, a pneumatic tire having such a tire noise reduction device is uneven in mass distribution in the circumferential direction of the tire. Therefore, a problem is that tire vibration is encouraged during running of a vehicle. In addition, with noise reduction of a vehicle, it is strongly required to further reduce tire noise.

Patent Document 1: Japanese Patent Application Kokai Publication 2003-226104

DISCLOSURE OF THE INVENTION

Problems to be Solved by the Invention

An object of the present invention is to provide a tire noise reduction device and a pneumatic tire, in which tire vibration can be reduced while durability is maintained and tire noise is further reduced.

Means for Solving the Problem

A tire noise reduction device according to the present invention for achieving the above object comprises: two main sound absorbing members for changing a cross-sectional area of a cavity of a tire in a circumferential direction of the tire, the two main sound absorbing members being disposed on an inner surface of a tread portion of the tire facing the cavity of the tire at two opposed locations in the circumferential direction of the tire, the two main sound absorbing members being formed of a porous material; and two assistant sound absorbing members disposed on the inner surface of the tread portion at two opposed locations in the circumferential direction of the tire between the two main sound absorbing members, the two assistant sound absorbing members being formed of a porous material, wherein the main sound absorbing members each comprise a first sound absorbing part located on a tread portion inner surface side thereof and a second sound absorbing part located on a side thereof away from the inner surface of the tread portion, the second sound absorbing part having a density lower than that of the first sound absorbing part, and wherein the assistant sound absorbing members each have a density higher than that of the second sound absorbing part and a thickness less than that of the main sound absorbing members.

A pneumatic tire according to the present invention has the above tire noise reduction device on an inner surface of a tread portion facing a cavity of the tire.

Effects of the Invention

According to the present invention mentioned above, the main sound absorbing members for changing a cross-sectional area of a cavity of a tire in the circumferential direction of the tire each comprise a first sound absorbing part with a high density and a second sound absorbing part with a low density instead of a conventional structure having only one with a high density. Therefore, the main sound absorbing members can be less in mass than before. On the other hand, since the assistant sound absorbing members are disposed between the main sound absorbing members, a difference in mass between a portion of the tire noise reduction device with a main sound absorbing member and a portion thereof with no main sound absorbing member can be less. Therefore, a mass distribution of a pneumatic tire having the tire noise reduction device can be made more even than before around the circumference of the tire, which allows for the reduction of tire vibration.

In addition, disposition of the assistant sound absorbing members enables a sound absorbing effect of the tire noise reduction device to be enhanced. Therefore, tire noise can be further reduced.

Further, since the first sound absorbing part with a high density is disposed on the tread portion inner surface side, and the assistant sound absorbing members comprise ones having a high density, damage to the main sound absorbing members and the assistant sound absorbing members arising from friction against the inner surface of the tread portion is suppressed, which allows durability at the same level as is conventional to be obtained.

DESCRIPTION OF THE SYMBOLS

| | |
|---|---|
| 1, 100, 200 | tire noise reduction device |
| 2 | elastic band (elastic ring) |
| 3 | main sound absorbing member |
| 3A | first sound absorbing part |
| 3B | second sound absorbing part |
| 4 | assistant sound absorbing member |
| 10 | pneumatic tire |
| 11 | tread portion |
| 11a | inner surface |
| 15 | cavity |
| t1, t2, t4 | thickness |

BEST MODES FOR CARRYING OUT THE INVENTION

Embodiments of the present invention will be described in detail below with reference to the attached drawings.

Figure 1:
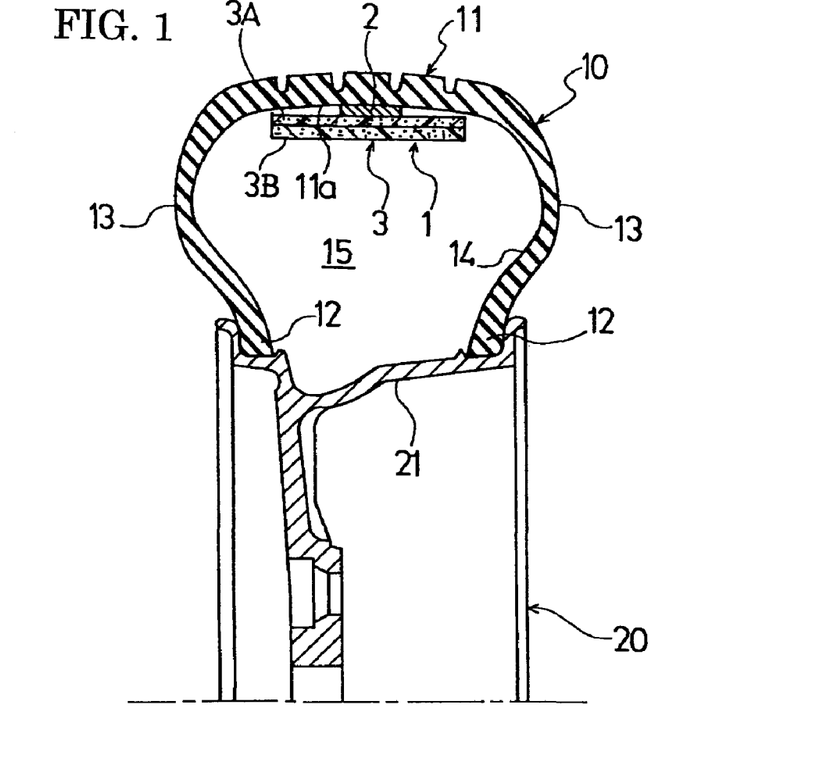
FIG. 1 is a cross-sectional view showing an embodiment of a tire noise reduction device according to the present invention in a state where it has been attached to a pneumatic tire.
Figure 2:
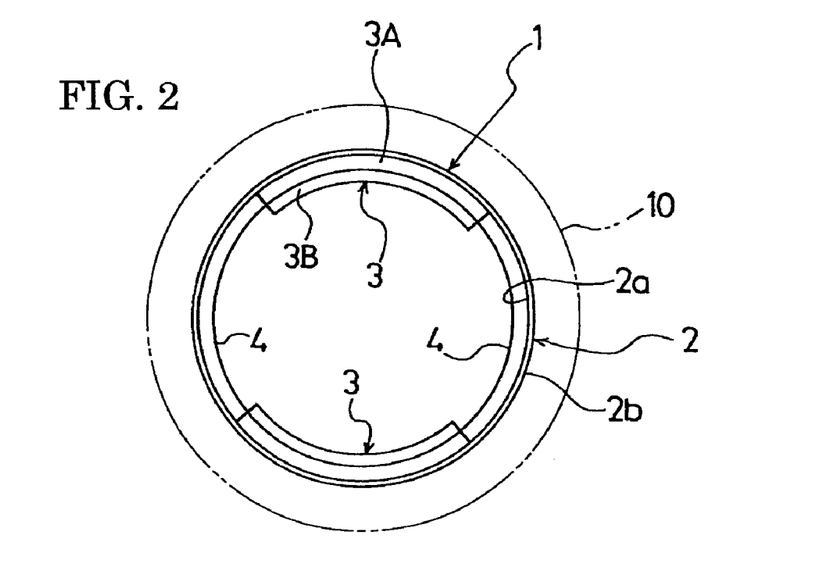
FIG. 2 is a side view of the tire noise reduction device of FIG. 1.

Referring to FIGS. 1 and 2, there is shown an embodiment of a tire noise reduction device according to the present invention; reference numeral 1 denotes a tire noise reduction device, reference numeral 10 denotes a pneumatic tire having the tire noise reduction device 1, and reference numeral 20 denotes a wheel.

The pneumatic tire 10 includes a tread portion 11, right and left bead portions 12 and right and left sidewall portions 13 connecting the tread portion 11 to the right and left bead portions 12. The pneumatic tire 10 has a cavity 15 which is a space surrounded by an inner surface 14 of the tire. The pneumatic tire 10 has been attached to the rim 21 of the wheel 20 so that the cavity 15 is airtightly sealed by the rim 21 of the wheel 20.

Although not shown in the drawings, a carcass ply extends between the right and left bead portions 12 inside the tire. A plurality of belt plies are provided radially outwardly of the carcass ply in the tread portion 11. A bead core is embedded in each of the right and left bead portions 12. The carcass ply has opposite ends which are turned up around the bead cores from the inner side toward the outer side in the axial direction of the tire.

Figure 3:
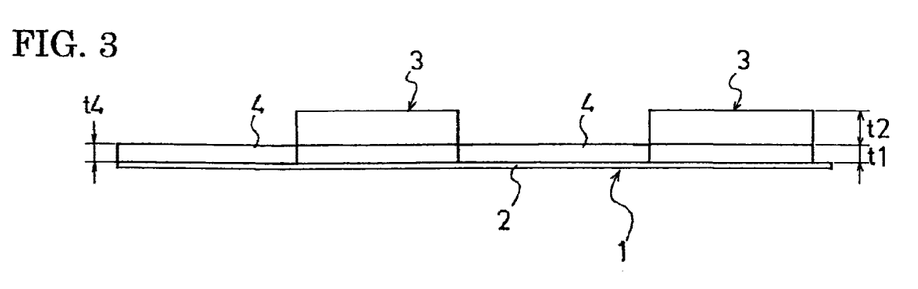
FIG. 3 is a side view showing the tire noise reduction device of FIG. 2 in a state where its annular elastic band is cut at one location and is extended.

The tire noise reduction device 1 is attached to the inner surface 11a of the tread portion 11 facing the cavity 15 of the pneumatic tire 10. As shown in FIGS. 2 and 3, the tire noise reduction device 1 has two main sound absorbing members 3 disposed on the inner surface 11a of the tread portion 11 at two opposed locations in a circumferential direction of the tire, two assistant sound absorbing members 4 disposed on the inner surface 11a of the tread portion 11 at two opposed locations in the circumferential direction of the tire between the main sound absorbing members 3, and an annular elastic band 2 for attaching the main sound absorbing members 3 and the assistant sound absorbing members 4 to the inner surface 11a of the tread portion 11.

The elastic band 2 comprises an elastic ring formed of a belt-shaped elastic body made in the form of a ring. The tire noise reduction device 1 is attached to the inner surface 11a of the tread portion 11 with the radially outer surface 2b of the elastic band 2 facing the inner surface 11a of the tread portion 11, using a resilient memory of the elastic band 2. As materials used for the elastic band 2, any materials may be used if they can provide the resilient memory for attachment. Metals such as stainless steel and resins such as nylon resins and polypropylene resins, for example, are preferably used for the materials. The elastic band 2 has the same size as is conventional; its width is preferably in the range of 10 to 30 mm, and its thickness is preferably in the range of 0.5 to 2.0 mm.

The main sound absorbing members 3 are respectively fixed with an adhesive agent or the like to the radially inner surface 2a of the annular elastic band 2 at locations apart from each other at 180°. The cross-sectional area of the tire cavity 15 in cross section taken in a plane that contains the axis of rotation of the tire is regularly changed in the circumferential direction of the tire by the main sound absorbing members 3 disposed on the elastic band 2 at the two opposed locations in the circumferential direction. The assistant sound absorbing members 4 are respectively fixed with an adhesive agent or the like to the radially inner surface 2a of the elastic band 2 at locations between the main sound absorbing members 3. The main sound absorbing members 3 and the assistant sound absorbing members 4 are attached to the elastic band 2 alternately in a circumferential direction of the ring. The sound absorbing members 3 and 4 are each formed of a porous material, and are attached to the inner surface 11a of the tread portion 11 by the resilient memory of the elastic band 2.

Each sound absorbing member 3 comprises a first sound absorbing part 3A located on the tread portion inner surface 11a side (elastic band radially inner surface 2a side) of the main sound absorbing member 3, and a second sound absorbing part 3B located on the side (first sound absorbing part 3A radially inner side) of the main sound absorbing member 3 away from the tread portion inner surface 11a. The first sound absorbing part 3A has a density as high as is conventional. The second sound absorbing part 3B has a density lower than that of the first sound absorbing part 3A, whereby the weight of the main sound absorbing member 3 is reduced. In the tire noise reduction device 1 shown in FIGS. 1 to 3, the first sound absorbing part 3A and the second sound absorbing part 3B each comprise one sound absorbing layer. The main sound absorbing member 3 is formed by bonding the sound absorbing layers disposed on each other. Instead of this, the main sound absorbing member 3 may be formed of one thick sound absorbing layer having a first sound absorbing part 3A and a second sound absorbing part 3B, the density of the main sound absorbing member 3 being changed as mentioned above.

Each assistant sound absorbing member 4 has a density which is higher than that of the second sound absorbing part 3B and is equal to that of the first sound absorbing part 3A. The thickness t4 of the assistant sound absorbing member 4 is less than the thickness of the main sound absorbing member 3, whereby the cross-sectional area of the tire cavity is varied around the circumference, reducing tire cavity resonance noise.

Figure 4:
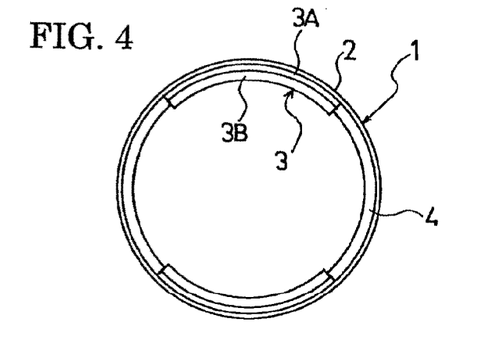
FIG. 4 is a side view showing another embodiment of a tire noise reduction device according to the present invention.

In FIGS. 2 and 3, the thickness t 4 of the assistant sound absorbing member 4 is the same as the thickness t1 of the first sound absorbing part 3A of the main sound absorbing member 3. However, as shown in FIG. 4, the thickness t 4 of the assistant sound absorbing member 4 may be greater than the thickness t1 of the first sound absorbing part 3A of the main sound absorbing member 3.

Figure 5:
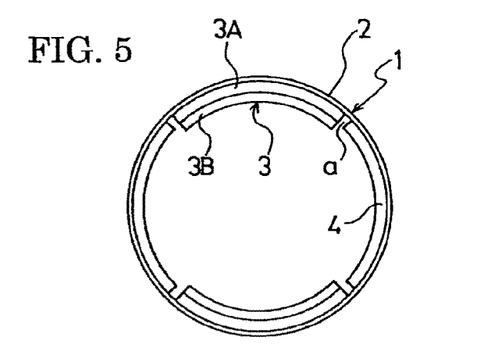
FIG. 5 is a side view showing still another embodiment of a tire noise reduction device according to the present invention.
Figure 6:
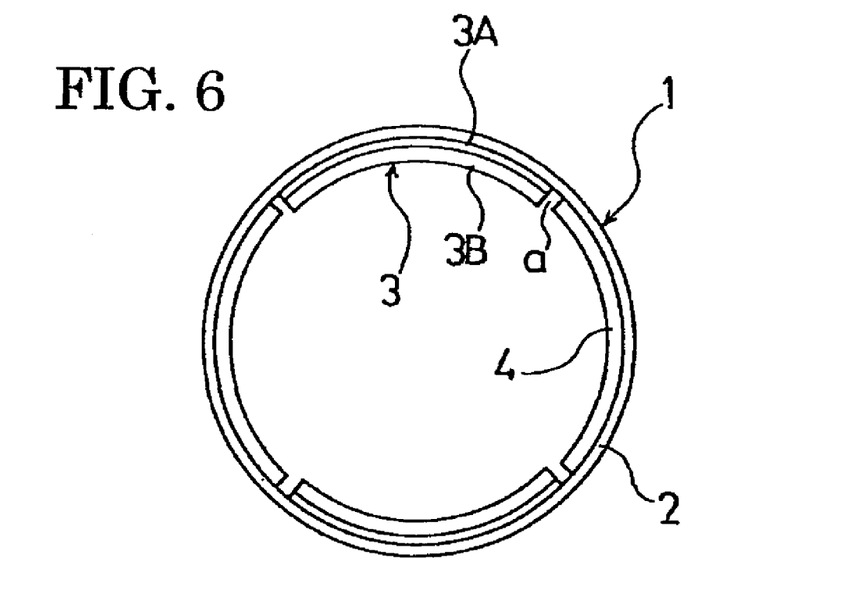
FIG. 6 is a side view showing still another embodiment of a tire noise reduction device according to the present invention.

The lengths of the main sound absorbing member 3 and the assistant sound absorbing member 4 are each preferably of a length of substantially ¼ of an inner peripheral length of the tire on an equatorial plane of the tire in terms of effective reduction of tire cavity resonance noise. In the embodiments shown in FIGS. 2 and 4, the main sound absorbing members 3 and the assistant sound absorbing members 4 each have a length of ¼ of the inner peripheral length of the tire on the equatorial plane of the tire; the main sound absorbing members 3 and the assistant sound absorbing members 4 are disposed such that adjacent main and assistant sound absorbing members 3 and 4 come into contact with each other. In the embodiments shown in FIGS. 5 and 6, the main sound absorbing members 3 and the assistant sound absorbing members 4 are disposed with a slight gap a between a main sound absorbing member 3 and a assistant sound absorbing member 4; the lengths of the main sound absorbing members 3 and the assistant sound absorbing members 4 are each substantially ¼ of the inner peripheral length of the tire.

As the porous material constituting the sound absorbing members 3 and 4, a resin foam, especially urethane resin foam (flexible polyurethane foam), is preferably used. A configuration of bubbles of the resin foam is preferably continuous so that adjacent bubbles communicate with each other.

The density of the first sound absorbing part 3A and the density of the assistant sound absorbing member 4 are preferably in the range of 18 kg/m$^3$ to 40 kg/m$^3$. If the density of the first sound absorbing part 3A and the assistant sound absorbing member 4 is less than 18 kg/m$^3$, the first sound absorbing part 3A and the assistant sound absorbing member 4 are subject to damage in coming into contact with and friction against the inner surface 11a of the tread portion during running of a vehicle. If the density of the first sound absorbing part 3A and the assistant sound absorbing member 4 is greater than 40 kg/m$^3$, it is not preferable because an excessive weight increase is incurred. Note that the density referred here is measured in accordance with JIS A7222.

The density of the second sound absorbing part 3B is preferably in the range of 40% to 80% of the density of the first sound absorbing part 3A. If the density of the second sound absorbing part 3B is under 40% of the density of the first sound absorbing part 3A, mechanical strength is degraded, whereby the second sound absorbing part 3B is subject to damage due to repeated bending deformation. If the density of the second sound absorbing part 3B is beyond 80% of the density of the first sound absorbing part 3A, it is difficult to effectively reduce weight.

The thickness of the main sound absorbing member 3 can be properly selected according to a tire size with the thickness t1 of the first sound absorbing part 3A and the thickness t2 of the second sound absorbing part 3B being respectively in the range of 4 mm to 20 mm. If the thicknesses t1, t2 of the first sound absorbing part 3A and the second sound absorbing part 3B are under 4 mm, it is difficult to provide a sound absorbing effect as a sound absorbing element. If the thicknesses t1, t2 of the first sound absorbing part 3A and the second sound absorbing part 3B are beyond 20 mm, bending stiffness is so high that it is difficult to place the main sound absorbing member 3 along the curvature of a tire to which it is attached, which causes vibration. The thickness t2 of the second sound absorbing part 3B is preferably greater than the thickness t1 of the first sound absorbing part 3A, whereby the cross-sectional area of the tire cavity can be varied while an increase in weight is suppressed. The thickness t4 of the assistant sound absorbing member 4 is preferably in the range of 4 mm to 20 mm as in the first sound absorbing part 3A in terms of attachability and a sound absorbing effect.

The widths of the main sound absorbing member 3 and the assistant sound absorbing member 4 can be 40% to 90% of a cross-sectional width of the tire; the widths may be constant or varied.

In the conventional tire noise reduction device, sound absorbing members with a high density (density of 18 kg/m$^3$ to 40 kg/m$^3$) are used for two sound absorbing members which are disposed on the inner surface of the tread portion at the two opposed locations in the circumferential direction of the tire and vary the cross-sectional area of the tire cavity in the circumferential direction of the tire, whereby damage to the sound absorbing members arising from friction against the inner surface of the tread portion is suppressed, obtaining durability of the sound absorbing members. However, since the sound absorbing members with a high density increase weight, a difference in mass is greater between a portion of the tire noise reduction device with a sound absorbing member and a portion thereof with no sound absorbing member, which makes a mass distribution of a tire having the tire noise reduction device uneven around the circumference of the tire, encouraging tire vibration during running of a vehicle. In particular, a secondary component of the vibration increases, and vibrates sympathetically with a steering system to thereby generate vehicle body vibration.

Therefore, in the present invention described above, each main sound absorbing member 3 for changing the cross-sectional area of the tire cavity 15 in the circumferential direction of the tire comprises the first sound absorbing part 3A with a high density and the second sound absorbing part 3B with a low density. This enables the main sound absorbing member 3 to be less in mass than before. On the other hand, since the assistant sound absorbing members 4 are disposed between the main sound absorbing members 3, a difference in mass is less between a portion of the tire noise reduction device 1 with a main sound absorbing member 3 and a portion thereof with no main sound absorbing member, which makes unevenness of a mass distribution of the pneumatic tire 10 having the tire noise reduction device 1 improved around the circumference of the tire, allowing tire vibration to be reduced.

In addition, by disposing the assistant sound absorbing members 4, a sound absorbing effect can be enhanced. Therefore, tire noise can be further reduced.

Further, since the first sound absorbing part 3A with a high density is placed on the tread portion inner surface 11a side, and the assistant sound absorbing members 4 are as high in density as the first sound absorbing part 3A, damage to the main sound absorbing members 3 and the assistant sound absorbing members 4 arising from friction against the inner surface 11a of the tread portion is suppressed, allowing durability at the same level as is conventional to be obtained.

Figure 7:
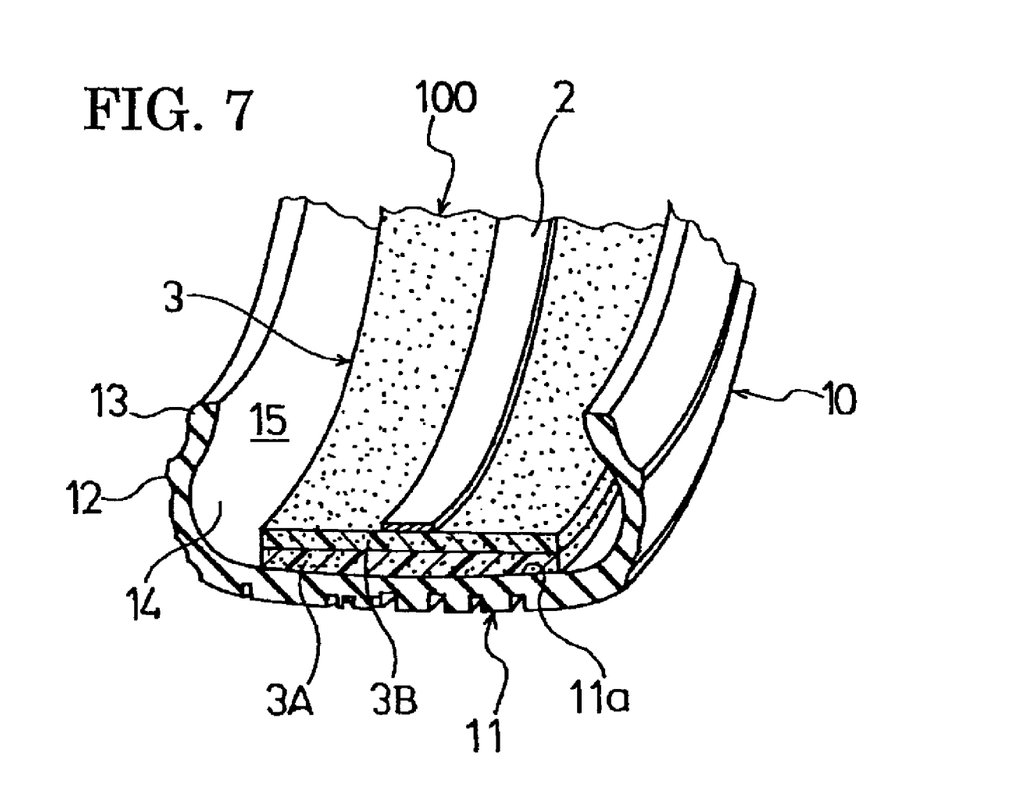
FIG. 7 is a fragmentary perspective view partially showing still another embodiment of a tire noise reduction device according to the present invention in a state where it has been attached to a pneumatic tire.

Referring to FIG. 7, there is shown another embodiment of a tire noise reduction device according to the present invention. The tire noise reduction device 100 of FIG. 7 is configured such that the main sound absorbing members 3 and the assistant sound absorbing members 4 are fixed to the radially outer side of the elastic band 2 instead of the above-described configuration that the main sound absorbing members 3 and the assistant sound absorbing members 4 are fixed to the radially inner side of the elastic band 2. When the above tire noise reduction device 100 has been attached to the inner surface 11a of the tread portion 11 facing the tire cavity 15, the same effects as the above can also be provided.

Figure 8:
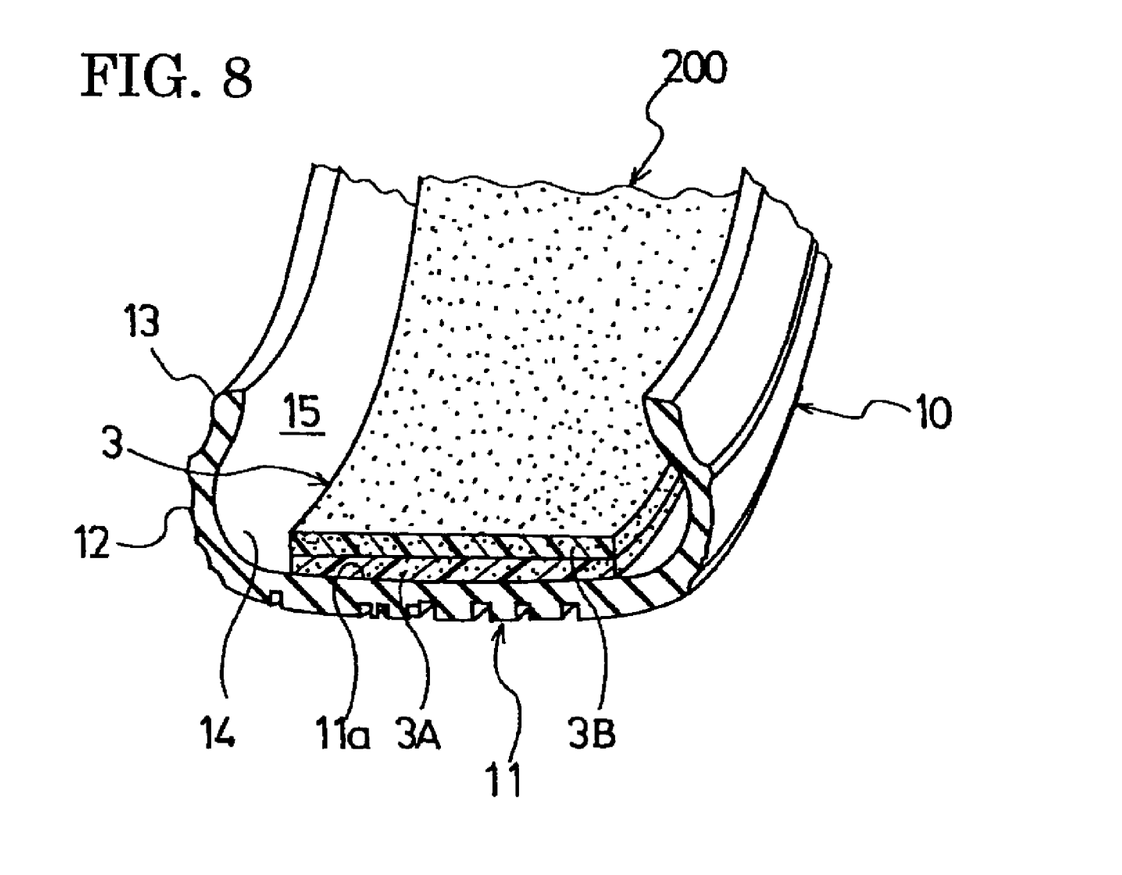
FIG. 8 is a fragmentary perspective view partially showing still another embodiment of a tire noise reduction device according to the present invention in a state where it has been attached to a pneumatic tire.

Referring to FIG. 8, there is shown still another embodiment of a tire noise reduction device according to the present invention. The tire noise reduction device 200 of FIG. 8 has no elastic band 2 described above. The main sound absorbing members 3 and the assistant sound absorbing members 4 are directly bonded to the inner surface 11a of the tread portion 11 with an adhesive agent or the like in such a manner that the main sound absorbing members 3 are disposed on the inner surface 11a of the tread portion 11 facing the tire cavity 15 at two opposed locations in the circumferential direction of the tire, and the assistant sound absorbing members 4 are disposed on the inner surface 11a of the tread portion 11 at two opposed locations in the circumferential direction of the tire between the main sound absorbing members 3. When the main sound absorbing members 3 and the assistant sound absorbing members 4 have been directly attached to the pneumatic tire 10 as described above, the same effects as the above can also be obtained.

EXAMPLE

Prepared respectively were tire noise reduction devices according to the tire noise reduction devices 1 to 3 of the present invention (present examples 1 to 3), conventional tire noise reduction device (conventional example) and comparative tire noise reduction device (comparative example), the tire noise reduction devices 1 to 3 of the present invention each having a structure shown in FIG. 2 in which the thicknesses and densities of the first sound absorbing part and the second sound absorbing part of each main sound absorbing member and the thickness and density of each assistant sound absorbing member were as shown in Table 1, the conventional tire noise reduction device having the same structure as the tire noise reduction device 1 of the present invention except that it had no assistant sound absorbing members and each main sound absorbing member consisted of the first sound absorbing part with a thickness of 15 mm, the comparative tire noise reduction device having the same structure as the tire noise reduction device 1 of the present invention except that it had no assistant sound absorbing members and each main sound absorbing member consisted of the second sound absorbing part with a thickness of 15 mm. A flexible polyurethane foam was used for each sound absorbing member of the tire noise reduction devices.

The tire noise reduction devices were each attached to the inner surface of the tread portion of a pneumatic tire having a tire size of 215/55R16, and the pneumatic tire was then assembled to a standard rim. Evaluation testing for tire noise and vibration, and durability was carried out according to the following methods, obtaining the results shown in Table 1.

Tire Noise

The rim-assembled pneumatic tires were inflated to an air pressure of 210 kPa, and mounted on a passenger car of 2500 cc displacement. The peak level of cavity resonance noise created inside the passenger car was measured when the car was run straight at a speed of 60 km/h on a test course. The measurement result is represented where the tire having the conventional tire noise reduction device is a reference.

Tire Vibration

The rim-assembled pneumatic tires were inflated to an air pressure of 210 kPa, and mounted on a passenger car of 2500 cc displacement. The vibration state of the steering when the passenger car was run on a test course was evaluated by a feeling of a test driver. The evaluation result is represented by a 5-point method where the conventional tire noise reduction device is 5.0. The less value means the lower tire vibration level.

Durability

The rim-assembled pneumatic tires were inflated to an air pressure of 210 kPa, mounted on a drum testing machine, and run for 80 hours under conditions of a load of 8.1 N, an ambient temperature of 38±3 degrees C., and a speed of 81 km/h. Thereafter, the tire noise reduction devices were each detached from the tire, and a state of damage (chipping and cracking) to each sound absorbing member of each tire noise reduction device was visually observed and evaluated. The evaluation result is represented by three levels of A1, A2 and A3. A1 means that damage does not occur at all. A2 means that occurrence of damage is slightly observed, the maximum length of a chipping part is less than 10 mm, the maximum depth of a cracking part is less than 5 mm and there is no problem in practical use. A3 means that occurrence of damage is observed, the maximum length of a chipping part is equal to or greater than 10 mm, the maximum depth of a cracking part is equal to or greater than 5 mm and there is a problem in practical use.

TABLE 1

|  | Conventional Example | Comparative Example | Present Example 1 | Present Example 2 | Present Example 3 |
| --- | --- | --- | --- | --- | --- |
| First Sound Absorbing Part |  |  |  |  |  |
| Thickness (mm) | 15 | — | 10 | 10 | 8 |
| Density (kg/m$^3$) | 28 | — | 28 | 20 | 28 |
| Second Sound Absorbing Part |  |  |  |  |  |
| Thickness (mm) | — | 15 | 15 | 15 | 12 |
| Density (kg/m$^3$) | — | 18 | 18 | 13 | 18 |
| Assistant Sound Absorbing Member |  |  |  |  |  |
| Thickness (mm) | — | — | 10 | 10 | 8 |
| Density (kg/m$^3$) | — | — | 28 | 20 | 28 |
| Noise (dB) | reference | 0 | −4 | −4 | −3.5 |
| Vibration | 5.0 | 3.0 | 3.0 | 2.75 | 2.5 |
| Durability | A2 | A3 | A2 | A2 | A2 |

From Table 1, it is understood that the tire noise reduction devices of the present invention can reduce tire vibration while tire noise is more reduced than the conventional tire noise reduction device. Further, it is understood that the tire noise reduction devices of the present invention can maintain durability at the same level as that of the conventional tire noise reduction device.

Industrial Applicability

The present invention having the aforementioned excellent effects is applicable to tire noise reduction devices for reducing noise arising from a cavity resonance phenomenon of a pneumatic tire.

What is claimed is:

1. A tire noise reduction device comprising:
   two main sound absorbing members for changing a cross-sectional area of a cavity of a tire in a circumferential direction of the tire, the two main sound absorbing members being disposed on an inner surface of a tread portion facing the cavity of the tire at two opposed locations in the circumferential direction of the tire, the two main sound absorbing members being formed of a porous material; and
   two assistant sound absorbing members disposed on the inner surface of the tread portion at two opposed locations in the circumferential direction of the tire between the two main sound absorbing members, the two assistant sound absorbing members being formed of a porous material,
   wherein the main sound absorbing members each comprise a first sound absorbing part located on a tread portion inner surface side thereof and a second sound absorbing part located on a side thereof away from the inner surface of the tread portion, the second sound absorbing part having a density lower than that of the first sound absorbing part,
   wherein the assistant sound absorbing members each have a density higher than that of the second sound absorbing part and equal to that of the first sound absorbing part,
   wherein each of the assistant sound absorbing members has a thickness less than that of the main sound absorbing members, and
   wherein the thickness of the assistant sound absorbing member is greater than the thickness of the first sound absorbing part.

2. A tire noise reduction device according to claim 1, wherein the main sound absorbing members and the assistant sound absorbing members are structured such that they are directly bonded to the inner surface of the tread portion.

3. A tire noise reduction device according to claim 1, further comprising an elastic ring for attaching the main sound absorbing members and the assistant sound absorbing members to the inner surface of the tread portion, the main sound absorbing members and the assistant sound absorbing members being fixed to the elastic ring alternately in a circumferential direction of the ring.

4. A tire noise reduction device according to claim 1, wherein the density of the first sound absorbing part and the density of the assistant sound absorbing members are 18 kg/m$^3$ to 40 kg/m$^3$, the density of the second sound absorbing part being 40% to 80% of the density of the first sound absorbing part.

5. A tire noise reduction device according to claim 1, wherein the first sound absorbing part and the second sound absorbing part each comprise one sound absorbing layer, each main sound absorbing member being formed by disposing the sound absorbing layers on each other.

6. A tire noise reduction device according to claim 1, wherein the first sound absorbing part and the second sound absorbing part are each 4 mm to 20 mm in thickness.

7. A tire noise reduction device according to claim 1, wherein the porous materials of the main sound absorbing members and the assistant sound absorbing members are urethane resin foam.

8. A tire noise reduction device according to claim 1, wherein the main sound absorbing members and the assistant sound absorbing members each have a length which is substantially ¼ of an inner peripheral length of the tire on an equatorial plane of the tire.

9. A pneumatic tire having a tire noise reduction device according to claim 1 on an inner surface of a tread portion facing a cavity of the tire.

10. A tire noise reduction device comprising:
    two main sound absorbing members for changing a cross-sectional area of a cavity of a tire in a circumferential direction of the tire, the two main sound absorbing members being disposed on an inner surface of a tread portion facing the cavity of the tire at two opposed locations in the circumferential direction of the tire, the two main sound absorbing members being formed of a porous material; and
    two assistant sound absorbing members disposed on the inner surface of the tread portion at two opposed locations in the circumferential direction of the tire between the two main sound absorbing members, the two assistant sound absorbing members being formed of a porous material, wherein a gap is defined in an area between each of the assistant sound absorbing members and an adjacent one of the main sound absorbing members,
    wherein the main sound absorbing members each comprise a first sound absorbing part located on a tread portion inner surface side thereof and a second sound absorbing part located on a side thereof away from the inner surface of the tread portion, the second sound absorbing part having a density lower than that of the first sound absorbing part,
    wherein the assistant sound absorbing members each have a density higher than that of the second sound absorbing part and equal to that of the first sound absorbing part, and a thickness less than that of the main sound absorbing members, and
    wherein the thickness of the assistant sound absorbing member is greater than the thickness of the first sound absorbing part.

11. A tire noise reduction device according to claim 10, wherein the main sound absorbing members and the assistant sound absorbing members are structured such that they are directly bonded to the inner surface of the tread portion.

12. A tire noise reduction device according to claim 10, further comprising an elastic ring for attaching the main sound absorbing members and the assistant sound absorbing members to the inner surface of the tread portion, the main sound absorbing members and the assistant sound absorbing members being fixed to the elastic ring alternately in a circumferential direction of the ring.

13. A tire noise reduction device according to claim 10, wherein the density of the first sound absorbing part and the density of the assistant sound absorbing members are 18 kg/m$^3$ to 40 kg/m$^3$, the density of the second sound absorbing part being 40% to 80% of the density of the first sound absorbing part.

14. A tire noise reduction device according to claim 10, wherein the first sound absorbing part and the second sound absorbing part each comprise one sound absorbing layer, each main sound absorbing member being formed by disposing the sound absorbing layers on each other.

15. A tire noise reduction device according to claim 10, wherein the first sound absorbing part and the second sound absorbing part are each 4 mm to 20 mm in thickness.

16. A tire noise reduction device according to claim 10, wherein the porous materials of the main sound absorbing members and the assistant sound absorbing members are urethane resin foam.

17. A tire noise reduction device according to claim 10, wherein the main sound absorbing members and the assistant sound absorbing members each have a length which is substantially ¼ of an inner peripheral length of the tire on an equatorial plane of the tire.

18. A pneumatic tire having a tire noise reduction device according to claim 10 on an inner surface of a tread portion facing a cavity of the tire.

* * * * *